United States Patent
Kim et al.

(10) Patent No.: US 12,393,527 B2
(45) Date of Patent: Aug. 19, 2025

(54) KEY-VALUE CACHING METHOD AND APPARATUS FOR EVENT-DRIVEN SYSTEM OPERATION ON GEO-DISTRIBUTED INFRASTRUCTURE

(71) Applicant: ELECTRONICS AND TELECOMMUNICATIONS RESEARCH INSTITUTE, Daejeon (KR)

(72) Inventors: Yun-Kon Kim, Daejeon (KR); Dong-Jae Kang, Daejeon (KR); Byoung-Seob Kim, Sejong-si (KR); Soo-Young Kim, Daejeon (KR); Seung-Jo Bae, Daejeon (KR); Ji-Hoon Seo, Sejong-si (KR); Seok-Ho Son, Daejeon (KR); Byeong-Thaek Oh, Sejong-si (KR); Young-Woo Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 43 days.

(21) Appl. No.: 18/507,348

(22) Filed: Nov. 13, 2023

(65) Prior Publication Data
US 2024/0256469 A1    Aug. 1, 2024

(30) Foreign Application Priority Data

Jan. 27, 2023    (KR) ........................ 10-2023-0010480

(51) Int. Cl.
*G06F 12/00*    (2006.01)
*G06F 12/0871*    (2016.01)
*G06F 12/14*    (2006.01)

(52) U.S. Cl.
CPC ...... *G06F 12/1475* (2013.01); *G06F 12/0871* (2013.01)

(58) Field of Classification Search
CPC ............. G06F 12/1466; G06F 12/1475; G06F 12/0871; G06F 9/52; G06F 13/1652
See application file for complete search history.

(56) References Cited

U.S. PATENT DOCUMENTS

| | | |
|---|---|---|
| 9,965,412 B2 | 5/2018 | Liu et al. |
| 10,275,357 B2 | 4/2019 | Choi et al. |
| 10,289,722 B2 | 5/2019 | Choi et al. |

(Continued)

FOREIGN PATENT DOCUMENTS

| | | |
|---|---|---|
| KR | 10-2017-0042217 A | 4/2017 |
| KR | 10-2017-0085944 A | 7/2017 |
| KR | 10-2367413 B1 | 2/2022 |

OTHER PUBLICATIONS

Seokho Son et al., "Performance-Aware Multi-Cloud Infrastructure Provisioning Based on Cloud-Barista Open Source Project", Journal of KIISE, Oct. 2022.

(Continued)

*Primary Examiner* — Shawn X Gu
(74) *Attorney, Agent, or Firm* — LRK PATENT LAW FIRM (57) ABSTRACT

Disclosed herein is a method for key-value caching. The method may include initializing a key-value cache and processing data in the order of a key-value store, a service, and the key-value cache.

14 Claims, 9 Drawing Sheets

(56) References Cited

U.S. PATENT DOCUMENTS

2008/0040604 A1    2/2008  Kim et al.
2015/0019812 A1*   1/2015  Ban .................... G06F 16/273
                                                    711/122
2018/0060544 A1    3/2018  Koo

OTHER PUBLICATIONS

Sooyoung Kim et al., "Design and Implementation of Multi-Cloud Service Common Platform", Journal of Korea Multimedia Society, Jan. 2021.

Michael Hausenblas et al., "Kubernetes and cloud native operations report 2021", Canonical, Jun. 29, 2021.

Diego Ongaro et al., "In Search of an Understandable Consensus Algorithm", 2014 USENIX Annual Technical Conference, Jun. 19, 2014.

Piotr Grzesik et al., "Evaluation of Key-Value Stores for Distributed Locking Purposes", 15th International Conference, BDAS, May 28, 2019.

* cited by examiner

Mechanism: key-value cache initialization

---

1: // Prepare for distributed lock
2: session, _ : concurrency.NewSession(etcdClient)
3: keyPrefix := set key prefix for locking a group of data
4: mutex := concurrency.NewMutex(session, keyPrefix)
5:
6: //Key-value cache initialization
7: mutex.Lock()
8:
9: // Watch the key to track value changes
10: Watch(keyPrefix)
11:
12: // Get all corresponding key-values with prefix option
13: kvs = Get(keyPrefix. WithPrefix())
14:
15: // Store all key-values to cache
16: cache.Store(kvs)
17:
18: mutex.Unlock()

| CSP | REGION CODE | REGION NAME | VM SPECIFICATION |
|---|---|---|---|
| AWS | aws-ap-northeast-2 | AsiaPacific (Seoul) | t2.micro |
| AWS | aws-ap-southeast-1 | AsiaPacific (Singapore) | t2.micro |
| AWS | aws-ca-central-1 | Canada (Central) | t2.micro |
| AWS | aws-us-west-1 | US West (N. California) | t2.micro |
| AWS | aws-us-east-1 | US East (N. Virginia) | t2.micro |
| GCP | gcp-asia-northeast3 | SeoulSouthKorea | e2-small |
| GCP | gcp-asia-east1 | ChanghuaCountyTaiwan | e2-small |
| GCP | gcp-asia-east2 | HongKong | e2-small |
| GCP | gcp-asia-northeast1 | TokyoJapan | e2-small |
| GCP | gcp-asia-northeast2 | OsakaJapan | e2-small |

FIG. 6

| NUMBER OF VMs | BEFORE APPLICATION | AFTER APPLICATION | RATE OF CHANGE |
|---|---|---|---|
| 10 | 21.0 | 22.5 | 8% |
| 20 | 40.5 | 30.4 | -25% |
| 30 | 61.7 | 42.7 | -31% |
| 40 | 102.4 | 59.0 | -42% |
| 50 | 137.2 | 85.9 | -37% |

FIG. 7

| NUMBER OF VM$_S$ | BEFORE APPLICATION | AFTER APPLICATION | RATE OF CHANGE |
|---|---|---|---|
| 10 | 419 | 145 | -65% |
| 20 | 2,781 | 862 | -69% |
| 30 | 7,046 | 2,608 | -63% |
| 40 | 16,592 | 5,838 | -65% |
| 50 | 21,302 | 11,021 | -48% |

KEY-VALUE CACHING METHOD AND APPARATUS FOR EVENT-DRIVEN SYSTEM OPERATION ON GEO-DISTRIBUTED INFRASTRUCTURE

CROSS REFERENCE TO RELATED APPLICATION

This application claims the benefit of Korean Patent Application No. 10-2023-0010480, filed on Jan. 27, 2023, which is hereby incorporated by reference in its entirety into this application.

BACKGROUND OF THE INVENTION

1. Technical Field

The present disclosure relates to a method and apparatus for efficient key-value caching for operating an event-driven system on geographically distributed infrastructure such as multi-cloud infrastructure.

2. Description of Related Art

Large-scale cloud providers build data centers distributed across multiple regions and pursue a policy for maintaining at least triple redundancy of data/services in order to provide stable cloud services, but service interruption cases caused by failure in a single cloud are often reported. As a result, a multi-cloud market for using clouds from two or more different cloud service providers is gradually expanding.

Cloud service users are aware that it is required to build multi-cloud infrastructure across multiple data centers, that is, geographically distributed infrastructure. Generally, when storage, databases, and the like are clustered, it is recommended to use three or more nodes. Considering fault tolerance or high availability, at least one of the three nodes is deployed and operated in a different data center when a cluster is configured.

Accordingly, event-driven systems typically formed of geographically adjacent nodes are increasingly changed to be formed on geographically distributed infrastructure.

However, the conventional event-driven systems may suffer from performance degradation due to the geographically distributed arrangement.

For example, when it needs to ensure data consistency, the conventional event-driven system has similar response times regardless of the location of a key-value store, thereby having the problem of increasing average latency.

Also, in the case of the conventional event-driven system, when various services refer to the same data in a key-value store, a critical section is formed, so they are required to access the shared data in a mutually exclusive manner using a distributed lock. Also, while a processing process is being performed after acquisition of the distributed lock, frequent input to or output from the key-value store occurs, which leads to additional waiting time until each service acquires the lock. As a result, the response time is further increased, whereby the performance in the operation of the event-driven system is further degraded.

Also, the conventional event-driven system is operated by being appropriately deployed or redeployed in nodes in a cluster, rather than being dependent on a specific node, but the method of deploying a general-purpose cache in a node and making various services share the same has a low efficiency problem when the services are rearranged.

SUMMARY OF THE INVENTION

An object of the present disclosure is to cache key-value pairs in a service in an event-driven system, thereby efficiently operating the service on distributed infrastructure.

In order to accomplish the above object, a method for key-value caching according to an embodiment may include initializing a key-value cache and processing data in the order of a key-value store, a service, and the key-value cache.

Initializing the key-value cache may include initializing a lock-related variable, attempting acquisition of a lock, waiting for the acquisition of the lock, enabling a watch function in order to track a change in a key, storing data related to the key-value cache in a cache, and releasing the lock after storing the data related to the key-value cache.

A lock may be applied to all keys during initialization of the key-value cache.

Processing the data may include pushing, by the key-value store, changed data to the service, storing, by the service, the received data in the key-value cache, and performing, by the service, a process of reading data from the key-value cache.

Processing the data may further include recording a result of performing the process in the key-value store.

Each of the key-value store and the service may be run on multi-cloud infrastructure.

Also, in order to accomplish the above object, an apparatus for key-value caching according to an embodiment includes memory in which a control program for key-value caching is stored and a processor for executing the control program stored in the memory. The processor may initialize a key-value cache and process data in the order of a key-value store, a service, and the key-value cache.

The processor may initialize the key-value cache by initializing a lock-related variable, attempting acquisition of a lock, waiting for the acquisition of the lock, and enabling a watch function in order to track a change in a key.

The processor may store data related to the key-value cache in a cache.

The processor may release the lock after storing the data related to the key-value cache.

The processor may apply a lock to all keys during initialization of the key-value cache.

The processor may process the data in such a way that the key-value store pushes changed data to the service, the service stores the received data in the key-value cache, and the service performs a process of reading data from the key-value cache.

The processor may record a result of performing the process in the key-value store.

The processor may be run on multi-cloud infrastructure.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

Figure 1:
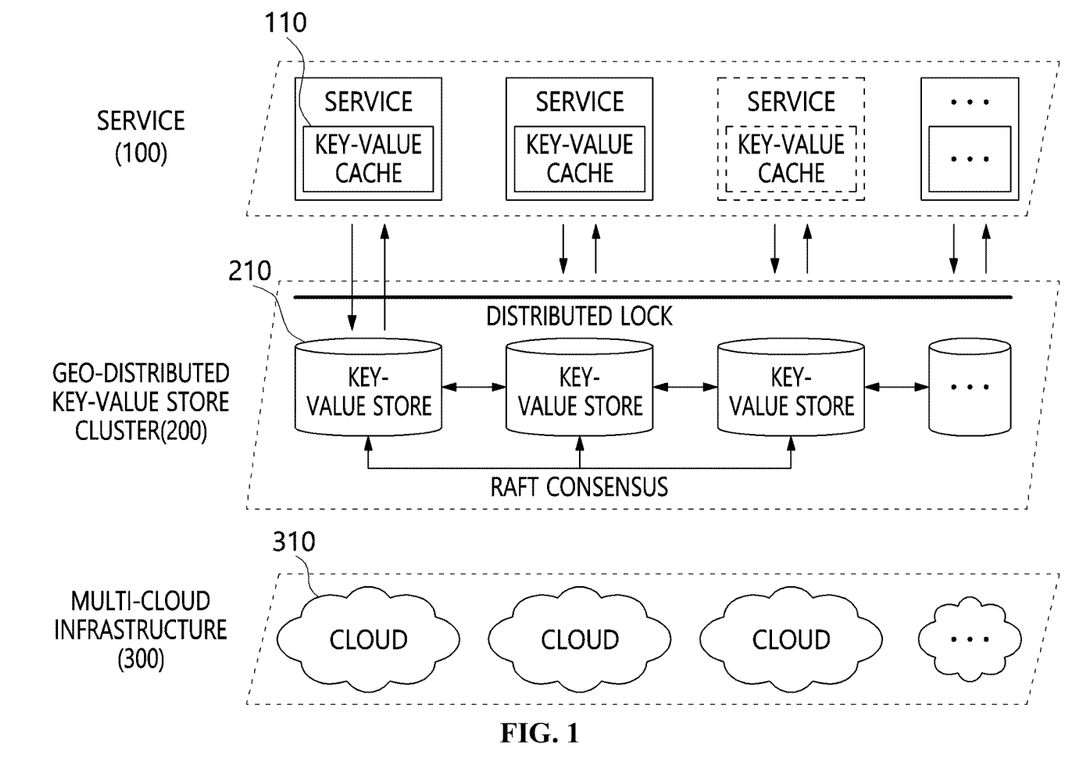
FIG. 1 is a concept diagram illustrating an event-driven system to which key-value caching is applied according to an embodiment.

FIG. 1 is a concept diagram illustrating an event-driven system to which key-value caching is applied according to an embodiment.

Referring to FIG. 1, the event-driven system to which key-value caching is applied includes services 100 and a key-value store cluster 200 formed of key-value stores 210. The services 100 and the key-value store cluster 200 may be run on multi-cloud infrastructure 300.

The key-value store cluster 200 is geographically distributed for fault tolerance, and in order to alleviate a performance issue resulting therefrom, a key-value cache 110 may be provided in the service 100.

Because the key-value cache 110 is disposed inside the service 100, it may operate normally even when the service 100 is deployed or redeployed in a dispersed location.

The event-driven system to which key-value caching is applied according to an embodiment may be a key-value caching apparatus for performing key-value caching.

Hereinafter, a key-value caching method performed by a key-value caching apparatus will be described.

Figure 2:
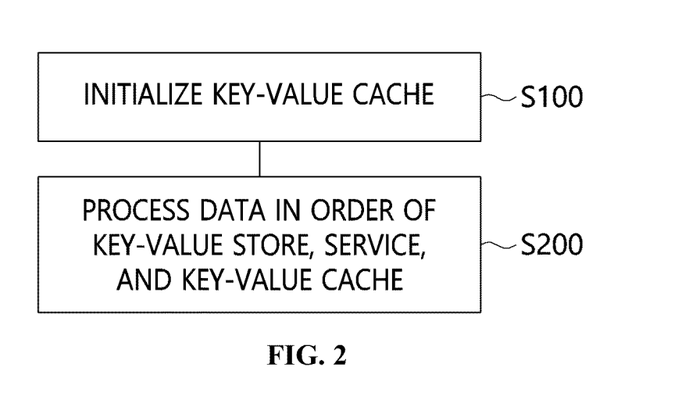
FIG. 2 is a flowchart illustrating a key-value caching method according to an embodiment.

FIG. 2 is a flowchart illustrating a key-value caching method according to an embodiment.

Referring to FIG. 2, a key-value cache may be initialized at step S100 in the key-value caching method according to an embodiment.

In order to ensure data consistency and improve operation performance, it is very important to initialize a key-value cache.

While the cache is being initialized for data consistency, all of the keys related thereto are regarded as a critical section, so it is required to apply a distributed lock. Each key has a form similar to a directory structure, and applying the lock may be understood similar to the concept of applying a lock to a parent directory. For example, when a key structure '/registry/network/group1/host1' is given and when 'host1' is initialized, the lock is applied to '/registry/network' or '/registry/network/group1' according to need, whereby associated data is prevented from changing until initialization is completed.

Figure 3:
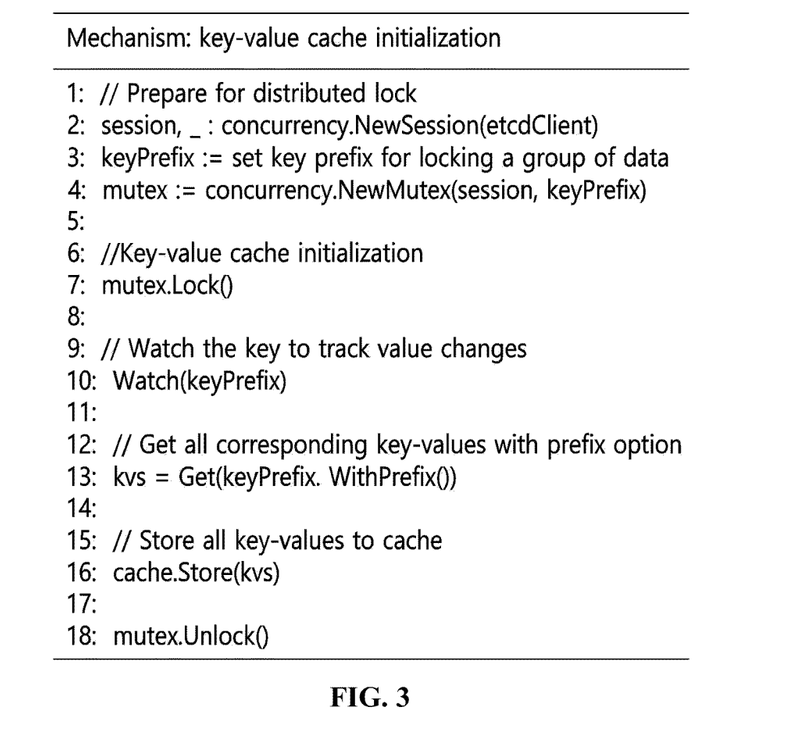
FIG. 3 is pseudocode illustrating a key-value cache initialization mechanism in a service according to an embodiment.

FIG. 3 is pseudocode illustrating a key-value cache initialization mechanism in a service according to an embodiment.

First, a variable or instance related to a distributed lock may be initialized (lines 1 to 4). Subsequently, acquiring a lock is attempted, and acquisition of the lock is waited for (line 7).

Subsequently, a watch function may be enabled in order to track a significant change in all keys (line 10). Subsequently, all related data is fetched and stored in a cache (lines 13 to 16). Finally, the lock is released (line 18).

Additionally, when multiple services are simultaneously executed, they compete for the initialization process, and additional latency may be caused due to the distributed lock. However, in spite of a little time loss during the initialization step, continuous time savings in the operation step can be expected, so the profit is greater than the loss.

Referring back to FIG. 2, data may be processed in the order of the key-value store, the service, and the key-value cache at step S200 in the key-value caching method according to an embodiment.

The mechanism of interaction between the service, the key-value store, and the key-value cache is very important because performance may vary depending on the mechanism. It is important to make data flow one-way and to avoid application of a distributed lock by making the most use of the data in the key-value cache.

Figure 4:
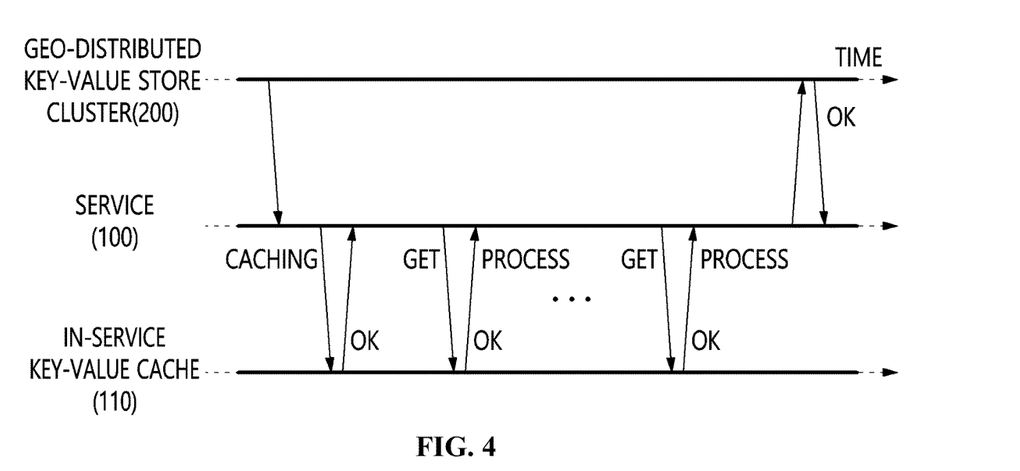
FIG. 4 is a view illustrating the mechanism of interaction for data in a key-value cache according to an embodiment.

FIG. 4 is a view illustrating an interaction mechanism for data in a key-value cache according to an embodiment.

As illustrated in FIG. 4, first, a key-value store of the key-value store cluster 200 may push changed data to a service 100 by the watch function enabled in the initialization mechanism.

The service 100 may process the received data and store the same in the key-value cache 110. The service 100 may perform required processing processes by reading data from the key-value cache 110. The result of performing the processing process may be recorded in the key-value store. During the processing process, data may be read from or written to the key-value store according to need, but the data flow should be preferably maintained in the order of the key-value store, the service, and the key-value cache.

Therefore, the latency and waiting time issues that arise when an event-driven system is operated on multi-cloud infrastructure may be alleviated based on the two key mechanisms, whereby the operation performance of the system may be improved.

Also, even when a service is redeployed, the service may be run without issues because the service includes and uses a cache. Further, there is an effect of reducing charges for outbound traffic in a multi-cloud environment.

The present disclosure addresses a performance issue in the process of researching and developing multi-cloud virtual network technology and solves the issue by designing efficient key-value caching. Accordingly, the effectiveness of the proposed key-value caching is demonstrated by evaluating the performance based on the multi-cloud virtual network technology. The multi-cloud virtual network technology is key technology by which a virtual network is established on multi-cloud infrastructure so the infrastructure and applications (e.g., virtual machines (VMs), containers, etc.) can be operated/managed based on a private IP as if they were in the same subnet. When infrastructure is actually established using the virtual machines of multiple cloud-service providers, it is not easy to form a cluster due to the difference in the networks, and even after the cluster is formed, communication failure may occur due to changes in the networks. Therefore, the multi-cloud network technology is required for smoothly operating the cloud service on multiple clouds.

The present disclosure describes a result of analyzing the cause of performance issues that arise when an event-driven system is operated on geographically distributed infrastructure. In order to solve the issues, efficient key-value caching configured to cache data in a service and use the same is proposed, and two key mechanisms are described. In order to demonstrate the effectiveness of the proposal, a performance test was performed in the multi-cloud virtual network system environment, and the result shows that the time taken to initially set a virtual network (initial setup time) is reduced by an average of 26% and the amounts of input/output data are also decreased by an average of 62%. Accordingly, it is confirmed that, when key-value caching is applied in a cluster of geographically distributed key-value stores, lots of advantages can be obtained in terms of performance and cost. The details are as follows:

Test Environment

Figure 5:
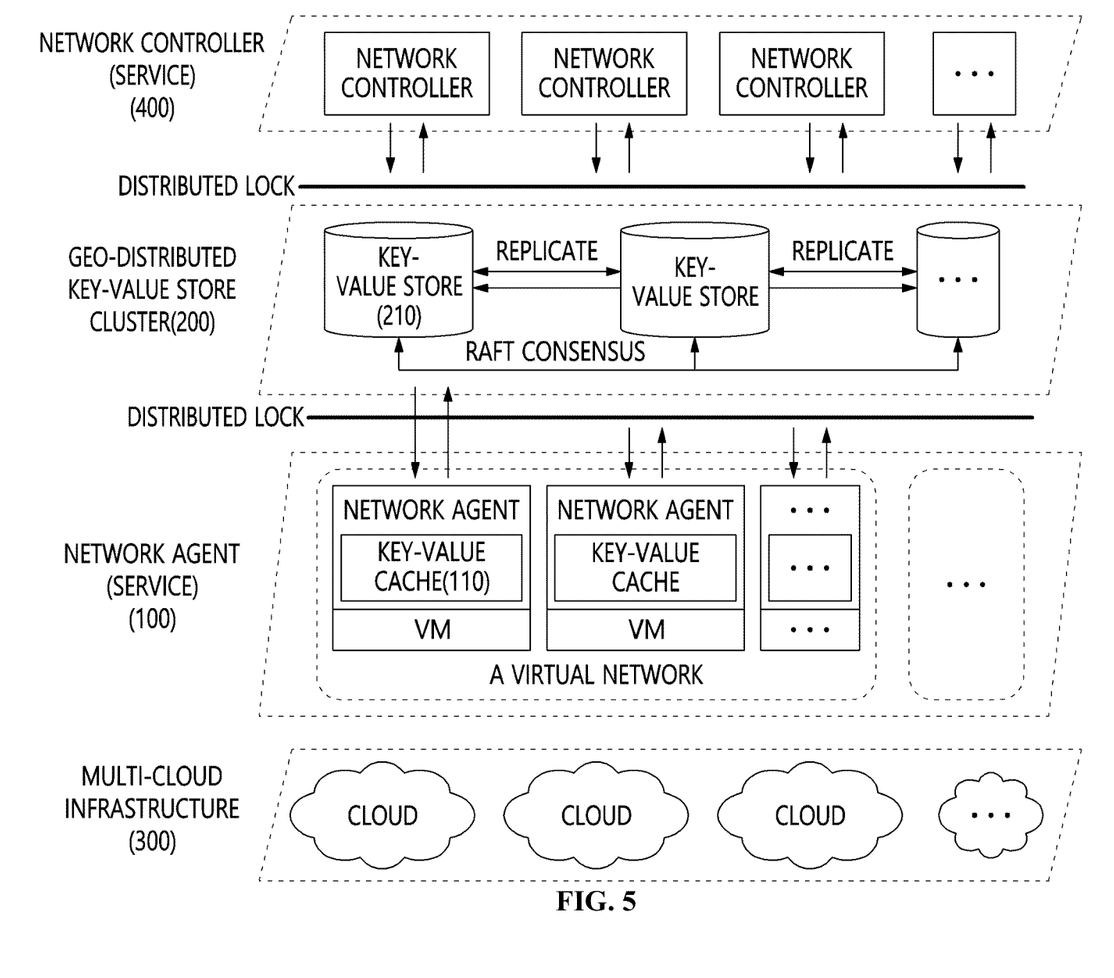
FIG. 5 is a block diagram illustrating a multi-cloud virtual network system operating based on an event according to an embodiment.

The multi-cloud virtual network system operating based on events is configured as shown in FIG. 5.

FIG. 5 is a block diagram illustrating a multi-cloud virtual network system operating based on events according to an embodiment.

As illustrated in FIG. 5, the multi-cloud virtual network system may include a control plane and a data plane.

The control plane may include a network controller (service) 400 and key-value stores 210. The data plane may include network agents (services) 100. The control plane may be run on multi-cloud infrastructure 300 for managing a virtual network.

For fault tolerance, the key-value stores 210 are located in one region in Singapore and two regions in Seoul. In order to reduce a distributed lock and input/output unrelated to the performance test for the proposed key-value caching, a single network controller 400 is run. The data plane is run on the multi-cloud infrastructure 300 on which a virtual network is established, and key-value caching is applied to the network agents 100.

Figure 6:
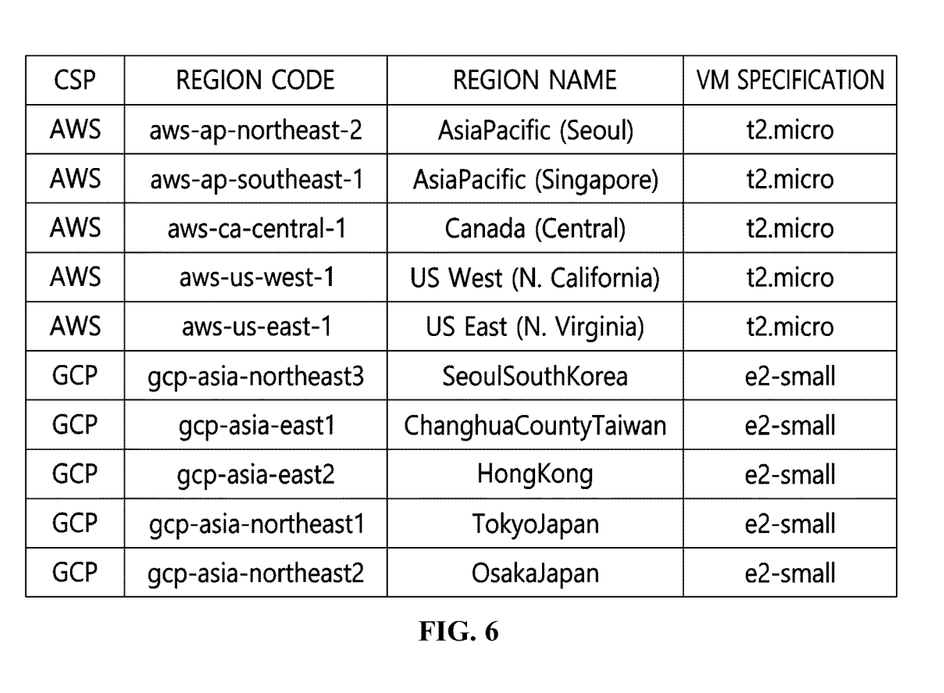
FIG. 6 is a view illustrating information of multi-cloud infrastructure (a data plane) across ten regions, on which a virtual network is to be established, according to an embodiment.

FIG. 6 is a view illustrating information about multi-cloud infrastructure (data plane) across ten regions in which a virtual network is to be established according to an embodiment.

As illustrated in FIG. 6, the Virtual Machine (VM) specification of Amazon Web Services (AWS) is t2.micro (vCPU: 1, Memory: 1 GiB), the VM specification of Google Cloud Platform (GCP) is e2-small (vCPU: 2, Memory: 2 GB), and the OS may be Ubuntu 18.04.

Test Method and Result Analysis

Performance tests are performed before and after application of the proposed key-value caching in the above-described environment, and the results thereof are compared. Considering the broad geographical distribution of the test environment and a competitive relationship, the effectiveness of the proposed mechanism is demonstrated by comparing the overall results rather than individual results. Also, in the case of the event-driven system, the entire system is organically operated as long as each of the services achieves the given objective. Because it is determined that it is difficult to describe the test scenario in chronological order, functions individually performed by each of the services before and after application of key-value caching are described.

Before application
Network Agent:
  be installed in and run on a VM
  record/update host network information in a key-value store
  watch a networking rule
  be updated and used according to a networking rule change event
Network Controller:
  watch the host network information
  be registered/updated as a peer of a virtual network according to a host network information change event
  watch peer information
  generate/update a networking rule based on information in the key-value store according to a peer information change event record the networking rule in the key-value store
After application
Network Agent:
  be installed in and run on a VM
  record and update host network information in a key-value store
  watch peer information
  store information in a key-value cache according to a peer information change event
  generate/update a networking rule based on information in the key-value cache
  record the networking rule in the key-value store
Network Controller:
  watch the host network information
  be registered/updated as a peer of a virtual network according to a host network information change event The performance test was performed in the state in which the control plane was operating, and the test was repeated while increasing the number of VMs to 10, 20, 30, 40, and 50 (by increasing the number of VMs in each region from 1 to 5). When creation of the VMs was completed, network agents were installed. The performance was measured from the time at which the first network agent was run to the time at which the initial setup of the virtual network in all of the participating VMs was completed. The effectiveness of the proposed key-value caching is demonstrated based on the initial setup time and the amount of input/output data acquired from the test.

Figure 7:
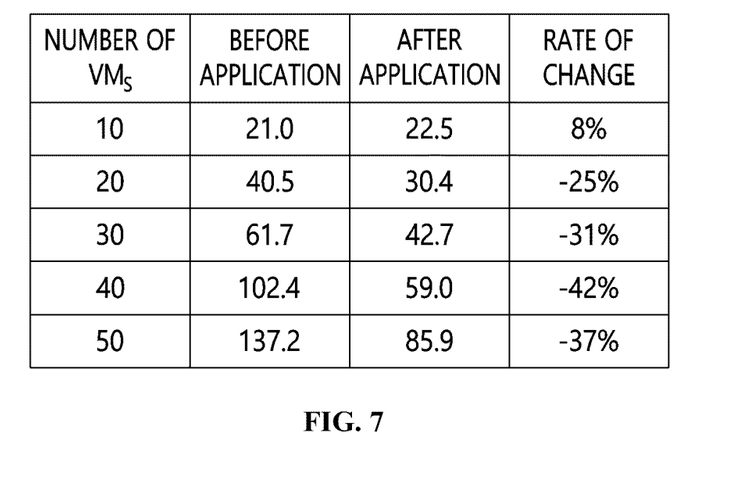
FIG. 7 is a view illustrating the average amount of time taken to initially set a virtual network before and after applying a key-value cache according to an embodiment.

FIG. 7 is a view illustrating the average amount of time taken to initially set a virtual network before and after application of key-value caching according to an embodiment.

As illustrated in FIG. 7, the time taken to initially set a virtual network before and after application of key-value caching is measured, and the average thereof is illustrated.

Here, the initial setup of the virtual network is performed in a competitive state, and the result includes waiting time caused by a distributed lock. When the overall average is calculated, the time is reduced by about 26% after application of the proposed mechanism. When the test was performed using a small number of VMs, the time was once increased, but the result shows that the time taken for the initial setup is decreased with an increase in the number of VMs.

Figure 8:
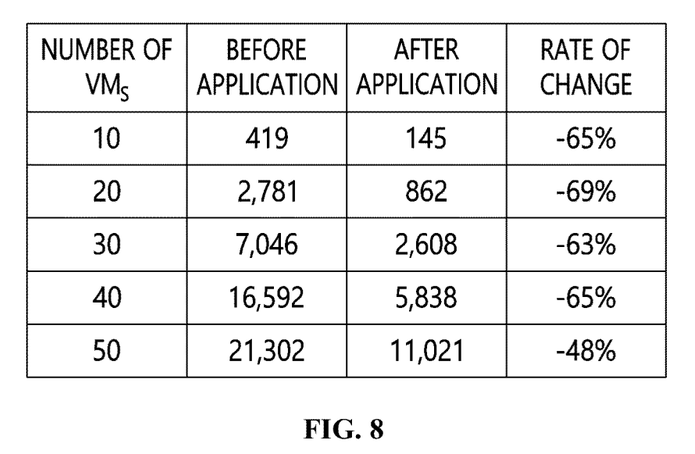
FIG. 8 is a view illustrating a result of measurement of the amount of data input to and output from a key-value store according to an embodiment.

FIG. 8 is a view illustrating a result of measurement of the amounts of data input to and output from a key-value store according to an embodiment.

As illustrated in FIG. 8, the amounts of data input to and output from a key-value store were measured when the above test was performed, and when the overall average is calculated, the amounts of input/output data are decreased by about 62% after application of the proposed algorithm. Considering the fact that charges for outbound traffic are incurred in a multi-cloud environment, this is a very meaningful result because charges can be reduced when an event-driven system is operated on multi-cloud infrastructure.

Figure 9:
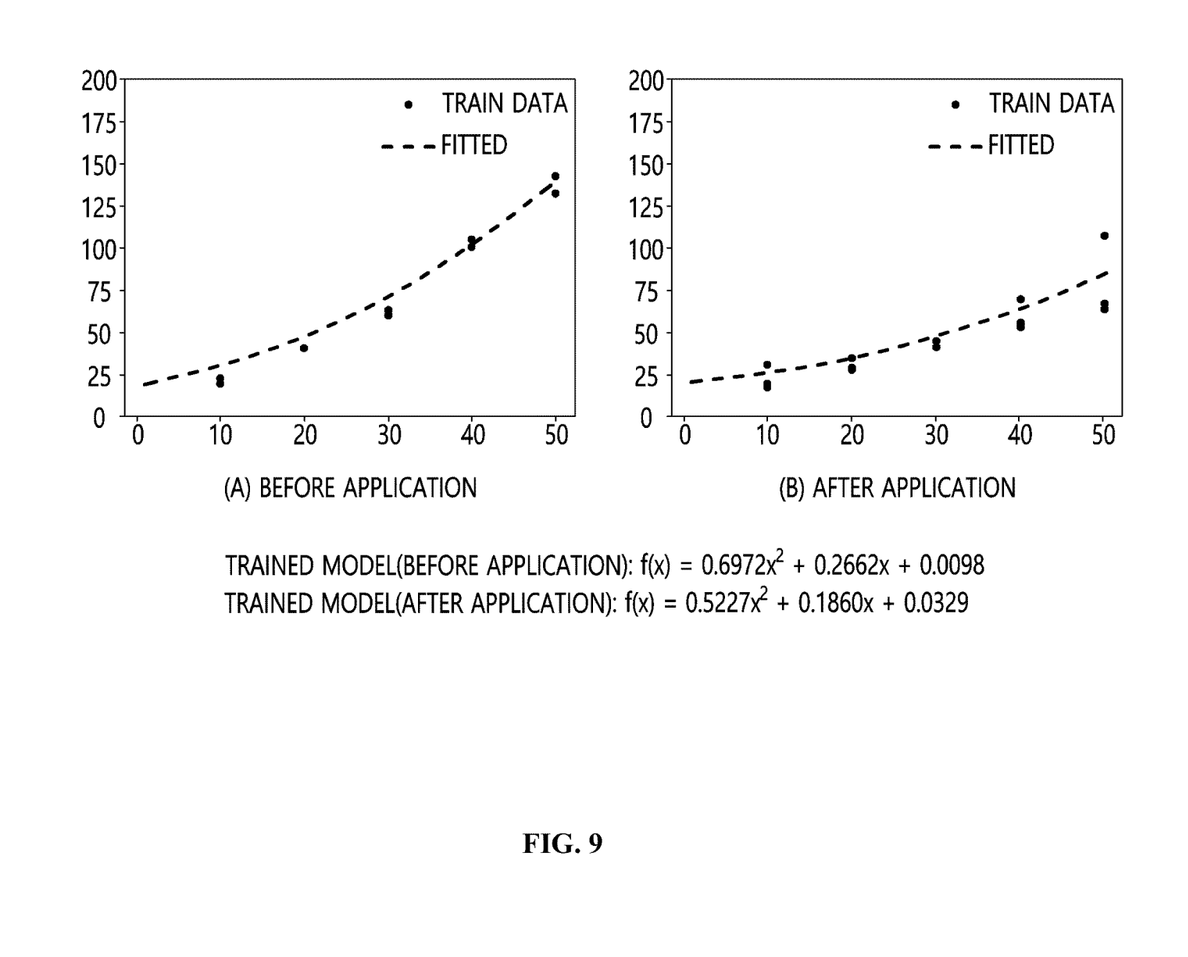
FIG. 9 and FIG. 10 are views illustrating models trained through nonlinear regression using PyTorch according to an embodiment.
Figure 10:
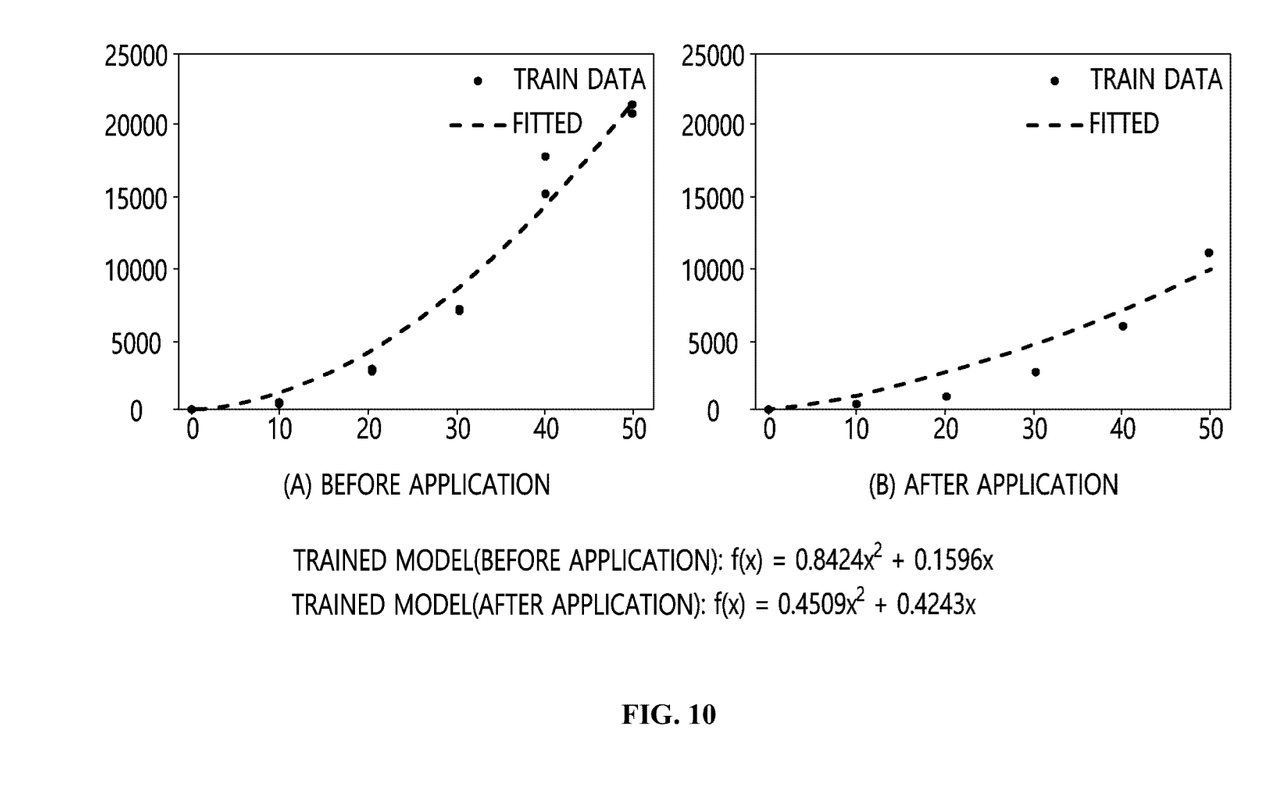

FIG. 9 and FIG. 10 are views illustrating models trained through nonlinear regression using PyTorch according to an embodiment.

As illustrated in FIG. 9 and FIG. 10, when the data pattern of the test result is analyzed, a non-linear pattern is shown. The model trained through nonlinear regression using PyTorch may be obtained.

The dots show the test result, and the dotted line shows the trained model. When the trained models before and after application of key-value caching are compared with each other, a gradual increase is observed after application of key-value caching. When the number of VMs is input to the trained model, the initial setup time and the amount of input/output data varying with a change in the number of VMs in the above-described environment may be estimated.

The apparatus for key-value caching according to an embodiment may be implemented in a computer system including a computer-readable recording medium.

Figure 11:
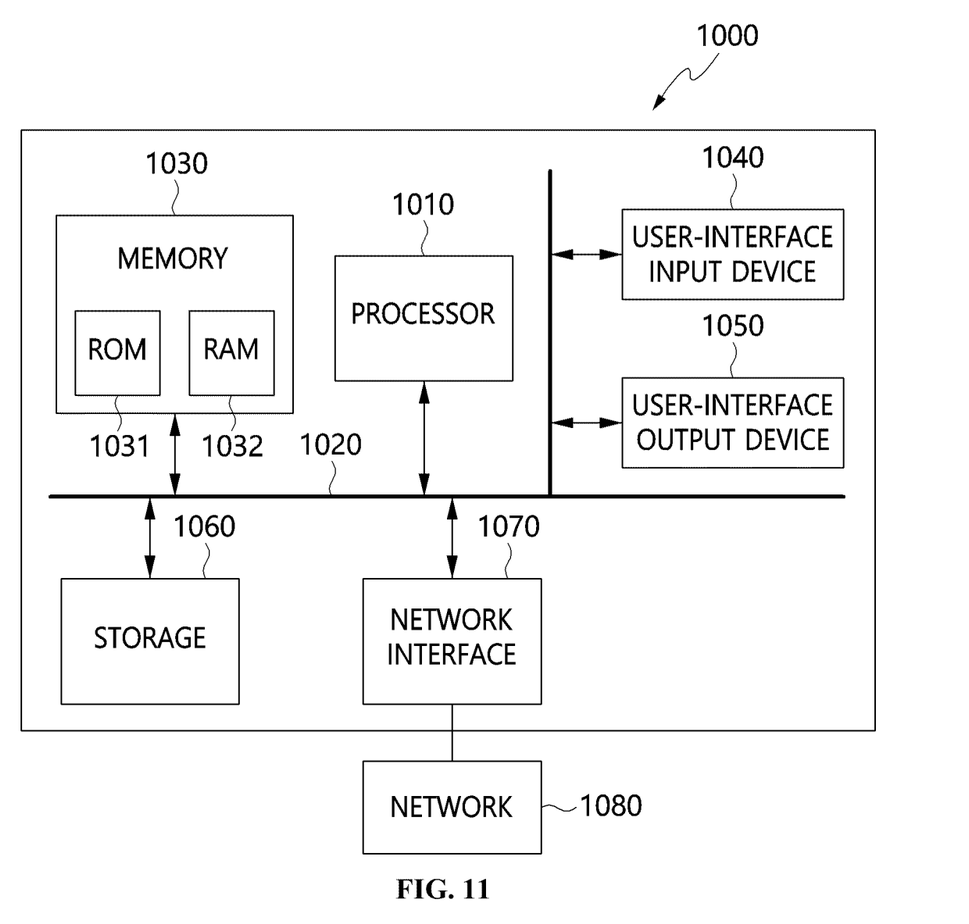
FIG. 11 is a block diagram illustrating the configuration of a computer system according to an embodiment.

FIG. 11 is a block diagram illustrating the configuration of a computer system according to an embodiment.

Referring to FIG. 11, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 maybe a central processing unit or a semiconductor device for executing a program or processing instructions stored in the memory or the storage. The processor 1010 is a kind of central processing unit, and may control the overall operation of the apparatus for key-value caching.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for key-value caching according to an embodiment. Specifically, the memory may store multiple applications running in the apparatus for key-value caching and data and instructions for operation of the apparatus for key-value caching.

The memory 1030 and the storage 1060 maybe storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program may contain instructions for making a processor perform a method including an operation for initializing a key-value cache and an operation for processing data in the order of a key-value store, a service, and the key-value cache.

According to an embodiment, a computer program stored in the computer-readable recording medium may include instructions for making a processor perform an operation for initializing a key-value cache and an operation for processing data in the order of a key-value store, a service, and the key-value cache.

An embodiment has the effect of enabling stable service operation by alleviating issues related to interaction (input/output and distributed lock/unlock) and geographical redeployment issues causing latency in distributed infrastructure.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for key-value caching, comprising:
    initializing a key-value cache; and
    processing data in an order of a key-value store, a service, and the key-value cache,
    wherein initializing the key-value cache includes:
    initializing a lock-related variable;
    attempting acquisition of a lock and waiting for the acquisition of the lock; and
    enabling a watch function in order to track a change in a key.

2. The method of claim 1, wherein initializing the key-value cache further includes storing data related to the key-value cache in the key-value cache.

3. The method of claim 2, wherein initializing the key-value cache further includes releasing the lock after storing the data related to the key-value cache.

4. The method of claim 1, wherein processing the data includes:
    pushing, by the key-value store, changed data to the service;
    storing, by the service, the received data in the key-value cache; and
    performing, by the service, a process of reading data from the key-value cache.

5. The method of claim 4, wherein processing the data further includes recording a result of performing the process in the key-value store.

6. The method of claim 1, wherein each of the key-value store and the service is run on multi-cloud infrastructure.

7. A method for key-value caching, comprising:
    initializing a key-value cache; and
    processing data in an order of a key-value store, a service, and the key-value cache,
    wherein a lock is applied to all keys during initialization of the key-value cache.

8. An apparatus for key-value caching, comprising:
    memory in which a control program for key-value caching is stored; and
    a processor for executing the control program stored in the memory,
    wherein the processor initializes a key-value cache and processes data in an order of a key-value store, a service, and the key-value cache,
    wherein the processor initializes a lock-related variable, attempts acquisition of a lock, waits for the acquisition of the lock, and enables a watch function in order to track a change in a key, thereby initializing the key-value cache.

9. The apparatus of claim 8, wherein the processor stores data related to the key-value cache in the key-value cache.

10. The apparatus of claim 9, wherein the processor releases the lock after storing the data related to the key-value cache.

11. The apparatus of claim 8, wherein the processor applies a lock to all keys during initialization of the key-value cache.

12. The apparatus of claim 8, wherein the processor processes the data in such a way that the key-value store pushes changed data to the service, the service stores the received data in the key-value cache, and the service performs a process of reading data from the key-value cache.

13. The apparatus of claim 12, wherein the processor records a result of performing the process in the key-value store.

14. The apparatus of claim 8, wherein each of the key-value store and the service is run on multi-cloud infrastructure.

* * * * *